(12) United States Patent
Park et al.

(10) Patent No.: US 10,054,799 B2
(45) Date of Patent: Aug. 21, 2018

(54) LENS DRIVING DEVICE, CAMERA MODULE AND OPTICAL APPARATUS

(71) Applicant: LG Innotek Co., Ltd., Seoul (KR)

(72) Inventors: Sang Ok Park, Seoul (KR); Sang Jun Min, Seoul (KR); Kyoung Ho Yoo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/008,507

(22) Filed: Jan. 28, 2016

(65) Prior Publication Data

US 2016/0216531 A1    Jul. 28, 2016

(30) Foreign Application Priority Data

Jan. 28, 2015  (KR) .................. 10-2015-0013331
Jan. 29, 2015  (KR) .................. 10-2015-0014078

(51) Int. Cl.
*G02B 7/02*     (2006.01)
*G02B 27/64*    (2006.01)
*H04N 5/225*    (2006.01)
*G02B 7/09*     (2006.01)

(52) U.S. Cl.
CPC ......... *G02B 27/646* (2013.01); *H04N 5/2254* (2013.01); *G02B 7/02* (2013.01); *G02B 7/023* (2013.01); *G02B 7/09* (2013.01)

(58) Field of Classification Search
CPC .............................................. G02B 7/00–7/40
USPC .................... 359/557, 694–706, 811–830
See application file for complete search history.

(56) References Cited

U.S. PATENT DOCUMENTS

| | | | |
|---|---|---|---|
| 9,335,507 B2 * | 5/2016 | Hagiwara | G02B 7/026 |
| 2013/0050828 A1 * | 2/2013 | Sato | G02B 27/64 |
| | | | 359/557 |
| 2016/0025995 A1 * | 1/2016 | Ariji | G02B 7/08 |
| | | | 359/557 |
| 2016/0187668 A1 * | 6/2016 | Hayashi | G02B 27/646 |
| | | | 359/507 |

FOREIGN PATENT DOCUMENTS

WO    WO 2013121788 A1 *    8/2013    ............... G02B 7/08

* cited by examiner

*Primary Examiner* — Nicholas R Pasko
(74) *Attorney, Agent, or Firm* — Saliwanchik, Lloyd & Eisenschenk

(57) ABSTRACT

A lens driving device including a first lens driving unit for auto focusing, and a second lens driving unit for handshake correction is proposed, the lens driving device including a base, a holder member mounted with a magnet and positioned at an upper side of the base by being spaced apart from the base at a predetermined distance, a plurality of support members configured to elastically support the holder member relative to the base, an upper stopper protrusively formed at an upper surface of the holder member, and a bottom stopper protrusively formed at a bottom surface of the holder member to form a shock point between the base and the holder member when there is generated a shock.

17 Claims, 5 Drawing Sheets

LENS DRIVING DEVICE, CAMERA MODULE AND OPTICAL APPARATUS

CROSS-REFERENCE TO RELATED APPLICATIONS

This application claims the benefit under 35 U.S.C. § 119 of Korean Application Nos. 10-2015-0013331, filed Jan. 28, 2015, and 10-2015-0014078, filed Jan. 29, 2015, which are hereby incorporated by reference in their entirety.

TECHNICAL FIELD

The present exemplary embodiments relate to a lens driving device, a camera module and an optical apparatus.

BACKGROUND

This section provides background information related to the present disclosure which is not necessarily prior art.

Concomitant with wide propagation of various mobile terminals and commercialization of wireless Internet services, demands by consumers related to the mobile terminals are diversified, and various types of additional equipment are attached to the mobile terminals.

Among the various types of additional equipment, a camera module may be a representative device capable of editing and transmitting a still image or a moving picture, as necessary, by photographing the still image or the moving picture, and storing the still image or the moving picture in image data. Recently, development is being waged for camera modules having a handshake correction function correcting a phenomenon of an image obtained from an image sensor being shaken in response to handshake of a user holding a mobile phone.

Meantime, a holder member fixing a lens may collide with a cover member or a base when a lens driving device having a handshake correction function is generated with an external shock. The shock applied to the lens driving device is conventionally asymmetrical such as a fall, and the applied shock is generated in such a manner as to be concentrated to any corner or a lateral surface, whereby a holder member may create a deformation of a support member supporting the holder member while the holder member moves beyond a design value. The problem is that, when the support member is deformed, the handshake correction control is not properly implemented, and an optical system cannot be normally aligned on an optical axis to disadvantageously disable a correct obtainment of an image. Another problem is that the handshake correction function cannot be properly operated, when changes are generated on a distance between a coil unit and a magnet performing a handshake correction function.

BRIEF SUMMARY

Exemplary aspects of the present disclosure are to substantially solve at least the above problems and/or disadvantages and to provide a lens driving device improved in structure to minimize generation of deformation on a support member even during an external shock.

Exemplary aspects of the present disclosure are to provide a lens driving device improved in structure to maintain reliability even during an external shock, and to allow a circuit board mounted with a coil unit at a predetermined position at all times to be mounted at a base by improving assemblability.

In one general aspect of the present disclosure, there is provided a lens driving device, the lens driving device including a first lens driving unit for auto focusing, and a second lens driving unit for handshake correction, the lens driving device comprising: a base; a holder member mounted with a magnet and positioned at an upper side of the base by being spaced apart from the base at a predetermined distance; a plurality of support members configured to elastically support the holder member relative to the base; an upper stopper protrusively formed at an upper surface of the holder member; and a bottom stopper protrusively formed at a bottom surface of the holder member to form a shock point between the base and the holder member when there is generated a shock.

Preferably, but not necessarily, the lens driving device may further comprise a circuit board arranged at a position corresponding to that of the magnet with a pattern coil unit, and the circuit board may include a first circuit board formed with an FPCB (Flexible Printed Circuit Board) and a second circuit board including a pattern coil unit formed with an FP (Fine Pattern) coil.

Preferably, but not necessarily, a distance between the bottom stopper and the base may be equal to or smaller than an air gap between the pattern coil unit and the magnet.

Preferably, but not necessarily, the shock point formed between the bottom stopper and the base may include a shock absorber including any one of a urethane or foam cushioning and a damper.

Preferably, but not necessarily, the lens driving device may further comprise at least one external stopper protrusively formed at an upper corner portion of the holder member.

Preferably, but not necessarily, the bottom stopper may be arranged at a position adjacent to the support member.

Preferably, but not necessarily, the bottom stopper may be protrusively formed at a position not interfering with the pattern coil unit.

Preferably, but not necessarily, the bottom stopper may be arranged free from being overlapped with an imaginary line passing through the upper stopper, where the upper stopper is protrusively formed at an upper surface of each wall surface at the holder member, and the bottom stopper may be protrusively formed at a bottom surface of a corner portion of the holder member to face the base.

Preferably, but not necessarily, the upper stopper may be arranged by being spaced apart from the cover member coupled to the base at a size same as a movement amount of the second lens driving device.

Preferably, but not necessarily, at least one support member may be mounted at each corner portion of the circuit board and the holder member.

Preferably, but not necessarily, the support member may be formed with a wire member, and two support members may be mounted at each corner portion of the circuit board and the holder member.

Preferably, but not necessarily, the support member and the bottom stopper may be so arranged as not to be interfered by each other.

A camera module according to an exemplary embodiment of the present disclosure may comprise: at least any one of an image sensor; a PCB mounted with the image sensor; and a lens driving device thus configured.

In another general aspect of the present disclosure, there is provided a lens driving device, comprising: a base; a circuit board mounted at an upper side of the base and arranged at an upper surface with a first coil; a bobbin wound at a circumference with a second coil and ascendably and descendably mounted relative to an optical axis; a holder member arranged with a magnet to allow the first coil and the second coil to face each other at mutually different surfaces; upper and bottom elastic members connected at one end to the bobbin and connected at the other end to the holder member to elastically support the bobbin to an optical axis direction; a support member connected to the upper elastic member to support a movement to a direction perpendicular to an optical axis of the holder member; and at least one first guide unit configured to guide an installation position of the circuit board on the base, wherein the first guide unit may include a guide lug protrusively formed at the base, and a through hole penetratively formed at a position corresponding to that of the guide lug.

Preferably, but not necessarily, a plurality of first guide units may be symmetrically formed relative to a center of the base and the circuit board.

Preferably, but not necessarily, the first guide unit may be arranged at a position not interfering with the first coil.

The lens driving device may further comprise a second guide unit configured to guide a position of a peripheral surface of the base and the circuit board, and the second guide unit may include a first boss protrusively formed at a position adjacent to a circumferential surface of the base, and a first groove part formed at a position corresponding to that of the first boss of the circuit board.

The first groove part may be concavely formed at a peripheral surface of the circuit board.

The first boss and the first groove part may be arranged at a position not interfering with the first coil.

The lens driving device may further comprise a third guide unit configured to guide a position of an inner surface of the base and the circuit board, and the third guide unit may include a second boss protrusively formed at a position adjacent to an inner circumferential surface of the base, and a second groove part formed at a position corresponding to that of the second boss of the circuit board.

A pair of third guide units may be symmetrically formed relative to a center of the base and the circuit board.

The support member may be formed with a wire member, and two support members may be mounted at each corner of the circuit board and the holder member.

The base may include a first concave part at a position adjacent to the guide lug, and an adhesive member is coated on the first concave part in order to fix the circuit board.

The base may further include at least one second concave part at a position not interfering with the first concave part and mounted with a position detection sensor configured to detect changes of magnetic force of a magnet opposite to the first coil, and the second concave part may be so arranged as not to interfere with the first concave part.

The circuit board may be provided with an escape part at a position opposite to the first coil, and the escape part may be coated with an adhesive member.

The circuit board may further include a plurality of terminal parts at an inner surface to fix the terminal part and a distal end of the first coil using a soldering.

The circuit board may be mounted at a surface opposite to the base with a position detection sensor insertedly coupled to the second concave part, and the position detection sensor may include a first sensor configured to sense a movement to an X axis direction of the holder member and a second sensor configured to sense a movement to a Y axis direction of the holder member.

The camera module according to an exemplary embodiment of the present disclosure may include an image sensor, a PCB mounted with the image sensor and the lens driving device thus configured.

In still another general aspect of the present disclosure, there is provided a lens driving device, comprising: a base; a holder member disposed at an upper side of the base and spaced from the base; a first driving part disposed at the holder member; a second driving part disposed at the base and facing the first driving part; a support member elastically supporting the holder member relative to the base; and a first stopper downwardly protruded from a lower surface of the holder member, wherein a lower distal end of the first stopper is disposed at an extreme lower end of the holder member.

The first driving part may include a magnet, and the second driving part may include a coil, and the lens driving device may comprise: a first circuit board positioned at an upper surface of the base; and a second circuit board positioned at an upper surface of the first circuit board, wherein a distance between the first stopper and the second circuit board may be equal to or smaller than a distance between the magnet and the coil.

The circuit board may be an FPCB (Flexible Printed Circuit Board), and the coil may be formed as a pattern coil unit on the second circuit board.

The lens driving device may further comprise a second stopper upwardly protruded from an upper surface of the holder member, and an upper distal end of the second stopper may be positioned at an extreme upper end of the holder member.

The second stopper may be positioned at an edge part where two adjacent lateral surfaces of the holder member meet.

The first stopper may be positioned at a bottom side thereof with a shock absorber including at least one of a urethane or foam cushioning and a damper.

The first stopper may be positioned at an edge part where two adjacent lateral surfaces of the holder member meet.

The support member may include a lateral support member coupled at an upper side to an upper surface of the holder member, and coupled at a bottom side to the first circuit board or to the second circuit board, wherein the first stopper may be positioned at an inner side of the lateral support member.

The first stopper may be free from being vertically overlapped with the second driving part.

The first stopper may be free from being vertically overlapped with the second stopper.

The second stopper may be coupled to the base and vertically overlapped with the cover member accommodating the holder member, and a distance between the first stopper and the second circuit board formed with the second driving part may be smaller than a distance between the second stopper and the cover member.

The holder member may include first to fourth lateral parts, and first to fourth edge parts positioned among the first to fourth lateral parts, wherein the support member may include two wires, two wires each being arranged at each of the first to fourth edge parts.

The first stopper may be so positioned as not to interfere with the support member.

The lens driving device may further comprise: a bobbin positioned at an inner side of the holder member; and a third driving part position at the bobbin and opposite to the first driving part, wherein the support member may include an upper support member coupled to an upper surface of the holder member and an upper surface of the bobbin, and a bottom support member coupled to a bottom surface of the holder member and a bottom surface of the bobbin.

The lens driving device may further comprise: at least one first guide unit positioned at the base to guide an installation position of the first circuit board, and the first guide unit may include a guide lug upwardly protruded from an upper surface of the base and a through hole formed on the first circuit board at a position corresponding to that of the guide lug.

The lens driving device may further comprise: a second guide unit configured to guide an external surface of the first circuit board, and the second guide unit may include a first boss positioned adjacently to a circumferential surface of the base to protrude upwardly from an upper surface of the base, and a first groove part formed on the first circuit board at a position corresponding to that of the first boss by allowing an external surface of the first circuit board to be inwardly sunk.

The lens driving device may further comprise: a third guide unit configured to guide an inner surface of the first circuit board, and the third guide unit may include a second boss positioned adjacently to an inner circumferential surface of the base to upwardly protrude from an upper surface of the base, and a second groove part formed on the first circuit board at a position corresponding to that of the second boss by allowing an inner surface of the first circuit board to be outwardly sunk.

In still further general aspect of the present disclosure, there is provided a camera module, comprising: a base; a holder member disposed at an upper side of the base and spaced from the base; a first driving part disposed at the holder member; a second driving part disposed at the base and facing the first driving part; a support member elastically supporting the holder member relative to the base; and a first stopper downwardly protruded from a lower surface of the holder member, wherein a lower distal end of the first stopper is disposed at an extreme lower end of the holder member.

In still further general aspect of the present disclosure, there is provided an optical apparatus, comprising: a base; a holder member disposed at an upper side of the base and spaced from the base; a first driving part disposed at the holder member; a second driving part disposed at the base and facing the first driving part; a support member elastically supporting the holder member relative to the base; and a first stopper downwardly protruded from a lower surface of the holder member, wherein a lower distal end of the first stopper is disposed at an extreme lower end of the holder member.

The exemplary embodiments of the present disclosure have an advantageous effect in that at least one upper stopper and at least one bottom stopper are protrusively formed at upper and bottom surfaces of a holder member wrapping a bobbin mounted with a plural sheet of lens capable of restricting a moving path to minimize deformation of a support member supporting the holder member by preventing the holder member from moving more than a predetermined distance, even when a sudden external shock is generated.

Another advantageous effect is that slanted movement of holder member to a portion being shocked is restricted by first and bottom stoppers to prevent deformation of a support member at any one corner, even when any one lateral side or corner side of the holder member is applied with a shock.

Still another advantageous effect is that guide means configured to fixedly couple a circuit board to a base at an accurate position and a space capable of coating an adhesive member are provided to accurately fix a position of circuit board and a position of position detection sensor at all times, whereby a product assemblability and operation reliability can be enhanced, and coupling between a circuit board and a coil unit can be tightly secured.

DETAILED DESCRIPTION

Hereinafter, some exemplary embodiments will be described with reference to the exemplary drawings. In designating elements in the drawings as reference numerals, wherever possible, the same reference numerals are used to refer to the same element, even though the same elements are illustrated in different drawings. In addition, in describing exemplary embodiments of the present disclosure, the detailed description may be omitted, when it is determined that a detailed description about known function or structure relating to the present disclosure may disturb understanding of exemplary embodiments of the present disclosure.

In addition, in describing elements of exemplary embodiments of the present disclosure, the terms such as "first", "second" "A", "B", "(a)" and "(b)" may be used. However, such terms are used merely to distinguish a particular element from another element, and therefore, essence, order or sequence of the relevant elements shall not be limited by the terms. It will be understood that an intervening elements may be "connected", "contacted" or "coupled" between the element and the other element, when an element is referred to as being "connected", "contacted" or "coupled" to another element, it can be directly connected, contacted or coupled to the other elements, or otherwise.

As used herein, the term "optical axis direction" is defined as a direction of an optical axis of a lens module coupled to a lens driving device. Meanwhile, the term "optical axis direction" may be used in combination with the terms such as "up/down (vertical) direction", "z-axis direction", etc.

As used herein, the term "auto focus function" is defined as a function to focus on a subject by moving a lens module in the optical axis direction according to a distance to the subject to adjust the distance between an image sensor and the subject, in order to form a clear image on the image sensor. Meanwhile, the term "auto focus" may be used in combination with the term "AF (Auto Focus)".

As used herein, the term "handshake correction function" is defined as a function to move or tilt a camera module in a direction perpendicular to the optical axis direction so as to counterbalance trembling (motion) generated by an image sensor due to external force. Meanwhile, the term "handshake correction" may be used in combination with the term "OIS (Optical Image Stabilization)".

Hereinafter, a structure of an optical apparatus according to an exemplary embodiment will be described.

Figure 1:
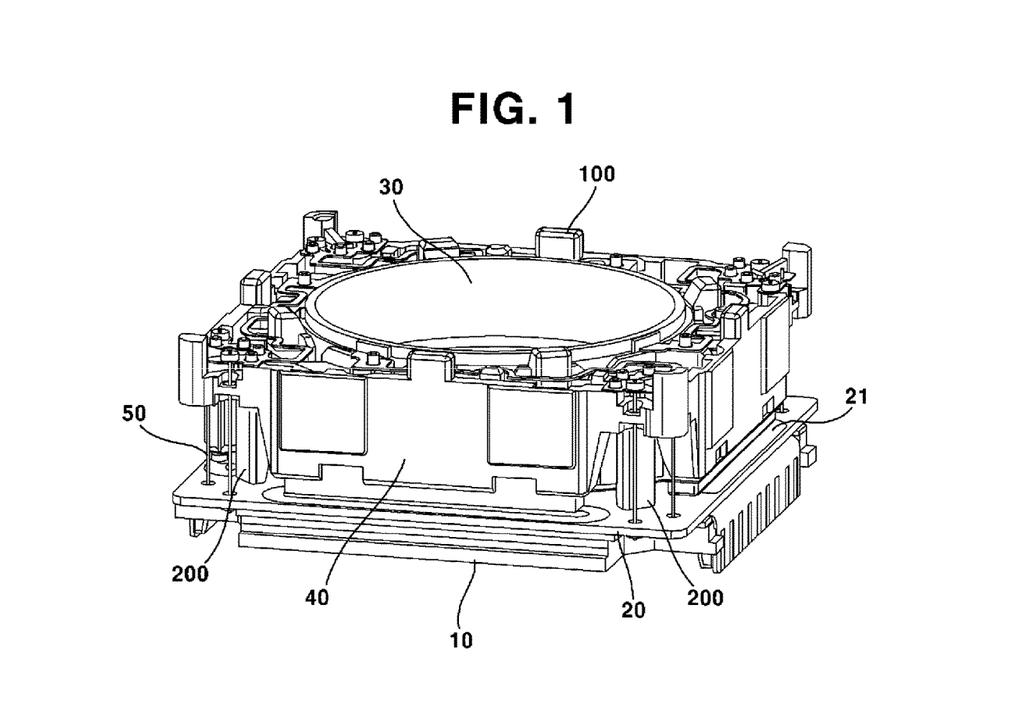
FIG. 1 is a perspective view illustrating a part of a lens driving device according to an exemplary embodiment of the present disclosure.
Figure 2:
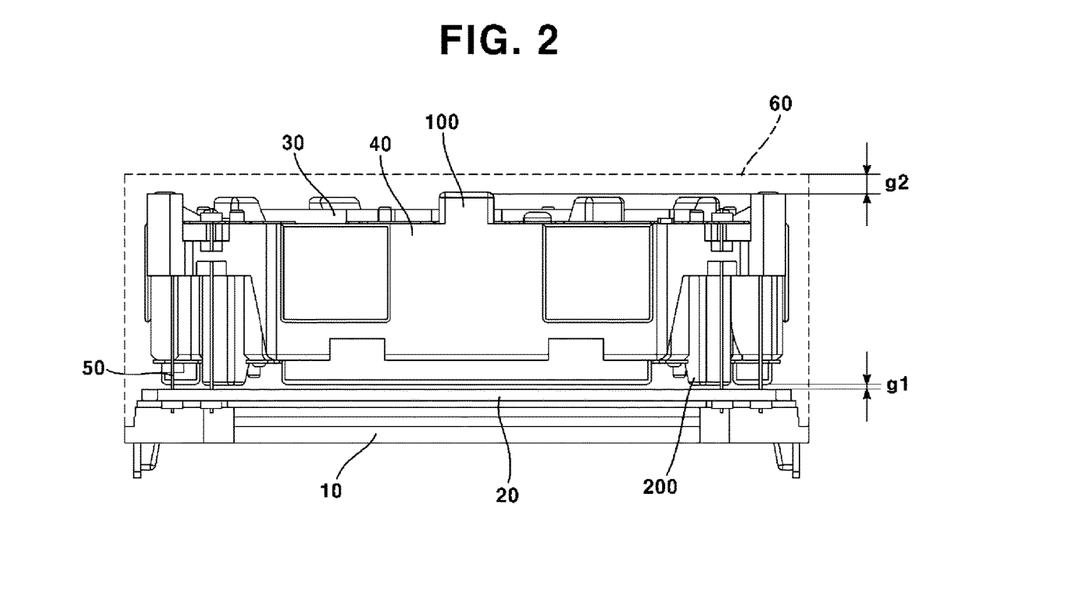
FIG. 2 is a lateral view illustrating a lateral surface of FIG. 1.
Figure 3A:
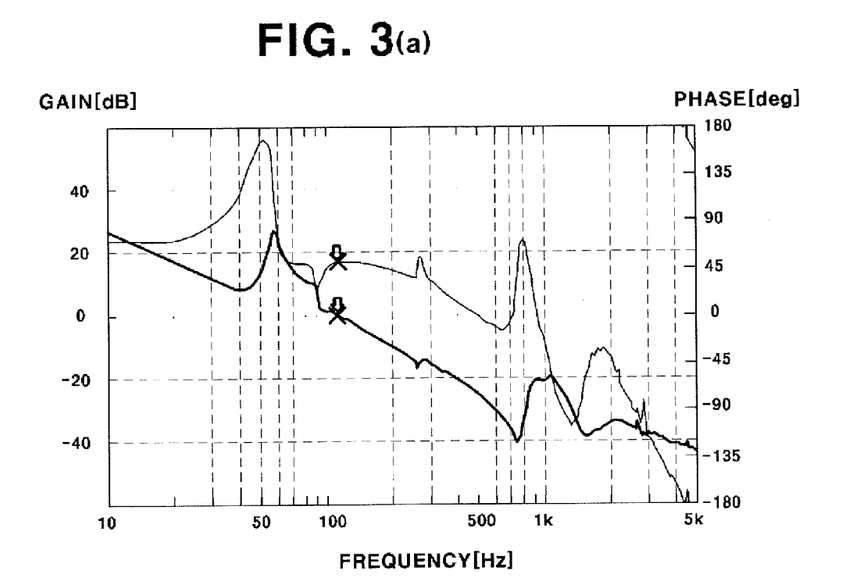
FIGS. 3(a) and 3(b) are graphs illustrating a frequency response characteristic of a lens driving device according to an exemplary embodiment of the present disclosure and a frequency response characteristic of a lens driving device according to prior art.
Figure 3B:
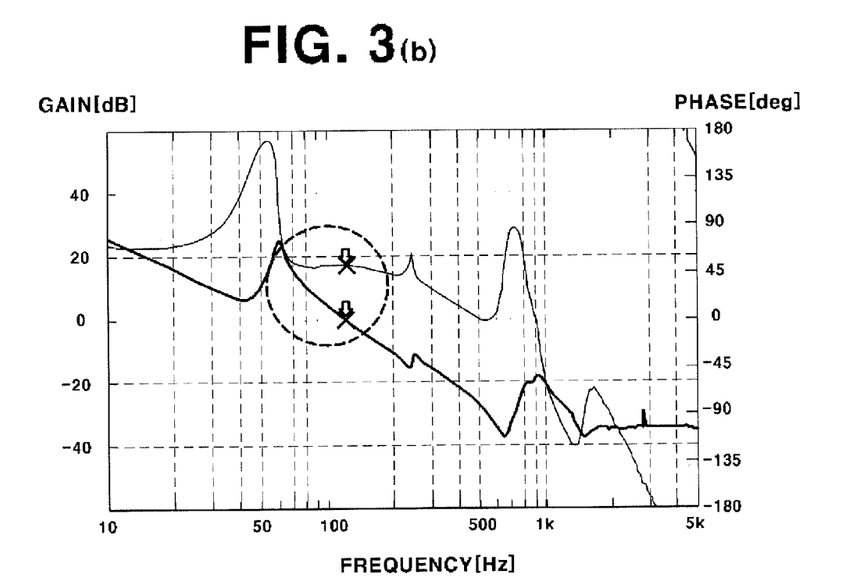

FIG. 1 is a perspective view illustrating a part of a lens driving device according to an exemplary embodiment of the present disclosure, FIG. 2 is a lateral view illustrating a lateral surface of FIG. 1, and FIGS. 3(a) and 3(b) are graphs illustrating a frequency response characteristic of a lens driving device according to an exemplary embodiment of the present disclosure and a frequency response characteristic of a lens driving device according to prior art.

Referring to FIGS. 1 and 2, a lens driving device according to an exemplary embodiment of the present disclosure may include first and second driving units, where the first lens driving unit may be a lens driving unit for AF (Auto Focusing), and the second lens driving unit may be a lens driving unit for handshake correction.

The first lens driving unit may include a base (10), a bobbin (30) and a holder member (40). The base (10) may be mounted at an upper side with at least one circuit board, and the circuit board may be mounted with a pattern coil for operating the second lens driving unit. Furthermore, the lens driving device may further include a cover member (60) to form an exterior of a camera module and to allow the holder member (40) supporting a plurality of magnets to be arranged thereinside. The base (10) may be coupled to the cover member (60).

The bobbin (30) may be reciprocally mounted to an optical axis direction at an inner space of the cover member (60). The bobbin (30) may be configured in a manner such that a coil unit may be mounted at a coil accommodation part formed at a periphery, where the coil unit may ascendably and descendably move the bobbin (30) to a direction parallel to an optical axis in response to an electromagnetic interaction with the plurality of magnets.

The bobbin (30) may be mounted at upper and bottom surfaces with the upper and bottom elastic members. The upper elastic member may be connected at one end to the bobbin (30) and connected at the other end to the holder member (40). The present disclosure is not limited thereto and the upper elastic member may be coupled to the cover member (60), if necessary. When the upper elastic member is coupled to the holder member (40), the upper elastic member may be coupled to an upper surface or a bottom surface of the holder member (60). The bottom elastic member may be connected at one end to the bobbin (30) and connected at the other end to an upper surface of the base or to a bottom surface of the holder member (60). Furthermore, the base (10) may be formed at a bottom side with a lug for coupling the bottom elastic member and a position corresponding to that of the bottom elastic member may be formed with a hole or a recess whereby the bottom elastic member can be coupled and the bottom elastic member can be prevented from rotating.

The holder member (40) may be formed with an approximately hexahedral shape. The holder member (40) may be respectively formed at upper and bottom surfaces with coupling structures for the upper and bottom elastic members to be coupled, and may be respectively formed at four corners or four lateral surfaces with magnets. At this time, positions where the magnets are mounted may be installed with accommodation parts (not shown). However, the present disclosure is not limited thereto, and magnets may be directly bonded and fixed to inner surfaces of the holder member (40) free from accommodation parts. When the magnets are directly fixed to the holder member (40), the magnets may be also directly bonded and fixed to lateral surfaces or corners of the holder member (40). Furthermore, unlike the exemplary embodiment, when an autofocusing unit is mounted instead of a handshake correction unit, only the cover member (60) may be mounted without a separate holder member (40).

The cover member (60) may be formed with a metal material of strong magnetic substance such as steel. Furthermore, the cover member (60) may be provided with an angular shape when viewed from an upper side in order to encompass all areas of the bobbin (30). Furthermore, the cover member (60) may take a square shape as illustrated in FIG. 2, and may be provided with an octagonal shape, albeit not being illustrated. In addition, when viewed from an upper side, and when the cover member (60) is provided with an octagonal shape, the magnetic field emitted from the corners of the holder member (40) may be minimized when the shape of magnet arranged at the corner of the holder member (40) is provided with a trapezoidal shape.

The first lens driving unit may be formed as discussed above, and the first lens driving unit may be also substituted with optical systems realized with other types of autofocusing functions than the abovementioned configuration. That is, the first lens driving unit may be also formed with an optical system using a single lens moving actuator or a refractive index-variable actuator instead of using the autofocusing actuator of VCM method. That is, any optical actuator capable of performing auto focusing function may be used for the first lens driving unit.

Meantime, the second lens driving unit may include, for handshake correction purpose, may include a first lens driving unit, a base (10), a support member (50), a circuit board (20) and a position detection sensor (not shown).

The circuit board (20) may include a first circuit board mounted with a position detection sensor, and a pattern coil unit (21). However, the present disclosure is not limited thereto, and the first circuit board and the pattern coil unit may be formed in a single circuit board. In the present exemplary embodiment, the circuit board (20) may be formed with mutually separated first and second circuit boards, where the second circuit board may be formed with an FP (Fine Pattern) coil, which is a pattern coil, and a second circuit board may be stacked at an upper surface of the first circuit board for mutual electric conduction therebetween.

Meantime, the pattern coil unit (21) may be assembled to the circuit board (20) as an individual element. At this time, the circuit board may be provided with an FPCB (Flexible Printed Circuit Board) and may be mounted at an upper surface of the base (10). The pattern coil unit may move an entire first lens driving unit to a plane direction perpendicular to an optical axis through mutual interaction with the magnet. The pattern coil unit (21) is arranged at a position of the circuit board (20) corresponding to that of a floor surface of the magnet by way of pattern coil, and when the magnet is mounted at each wall surface area of the holder member (40), for example, the pattern coil unit (21) may be arranged at each surface area mutually corresponding to that of the circuit board (20).

The position detection sensor may be mounted at the circuit board (20). The present disclosure is not limited thereto and the position detection sensor may be separately arranged as an individual element, and may be also integrally formed with the circuit board (20). The position detection sensor can detect a movement to a direction perpendicular to an optical axis of the holder member (40) mounted with the magnet by detecting a magnetic field of the magnet.

Meantime, the lens driving device according to an exemplary embodiment of the present disclosure may be arranged at upper and bottom surfaces of the holder member (40) with an (or first) upper stopper (100), or a bottom stopper (200) in order to minimize damage to the support member (50) when there is generated a sudden external shock. At this time, an external stopper (300) may be additionally added.

The upper stopper (100) may be protrusively formed at an upper surface of the holder member (40) in a plural number as illustrated in FIGS. 1 and 2. The upper stopper (100) may be arranged at an approximate center area of each surface of the holder member (40) according to an exemplary embodiment of the present disclosure. However, the present disclosure is not limited thereto, and two upper stoppers may be arranged at each surface if necessary. The upper stopper (100) may be provided with a hexahedral shape, where an upper surface of the upper stopper may be flatly formed. The upper stopper (100) may be spaced apart from the cover member (60) at a predetermined distance as illustrated in FIG. 2. Furthermore, the upper stopper (100) may be formed by being spaced apart from the cover member (not shown) with a same movement amount and a same size of the second lens driving device.

The bottom stopper (200) may be protrusively formed at a bottom surface of the holder member (40) in a plural number as illustrated in FIGS. 1 and 2. The bottom stopper (200) may be arranged in disagreement with the upper stopper (100) according to the exemplary embodiment of the present disclosure. For example, as illustrated in FIGS. 1 and 2, the bottom stopper (200) may be so arranged as not to overlap with an imaginary line passing a center of the upper stopper (100), where one bottom stopper (200) may be protrusively formed at each corner area of the holder member (40) when the upper stopper (100) is protrusively formed at each upper surface of lateral wall of the holder member (40). However, the present disclosure is not limited thereto, and the bottom stopper (200) may be formed at any place as long as the bottom stopper is not interfered with other peripheral elements. In the present exemplary embodiment, a magnet may be arranged at each inner surface of the holder member and the bottom stopper (200) may be arranged at the corner.

The bottom stopper (200) may be arranged at a corner area not interfering with the pattern coil unit (21) according to the exemplary embodiment, where, when the support member (50) is provided with a wire shape and arranged at each corner area, the bottom stopper (200) may be arranged near to the wire-shaped support member (50).

That is, when a handshake correction support member (50) is positioned at a diagonal direction, the bottom stopper (200) may be arranged at a corner area of the holder member (40), and when the support member (50) is arranged at each surface area, the bottom stopper (200) may be arranged at a corresponding position. However, the present disclosure is not limited thereto, and the bottom stopper (200) may be formed at any place where interference with the pattern coil unit (21) is ruled out. Furthermore, the support member (50) of wire configuration may be connected using soldering method by passing a hole of the circuit board as illustrated in FIG. 1. However, the present disclosure is not limited thereto, and the support member (50) may be connected to an upper surface of the first or second circuit board using soldering method.

Furthermore, the bottom stopper (200) may be spaced apart from the base (10) at a predetermined distance (g1) as illustrated in FIG. 2, and the bottom stopper (200) may be so configured as a shock-point during generation of shock to be located at an upper surface of the base (10), or the first circuit board or the second circuit board. At this time, the prevention of shock may be effective when a distance between an upper surface of the bottom stopper (200) and the base (10), or a distance between the shock point formed on the first circuit board or the second circuit board is equal to or smaller than a gap between the pattern coil unit (21) and the magnet. Alternatively, the prevention of shock may be effective when a separate metal member arranged at an upper surface of the base becomes a shock point. The metal member may be a magnetic flux-concentrating yoke, and in this case, the base, the metal member and the circuit board may be sequentially arranged in that order. At this time, the second circuit board at an area shocked by the bottom stopper (200) may be escaped to allow the bottom stopper (200) to be directly shocked with the base (10). At this time, a circuit board including the pattern coil unit (21) or the second circuit board is so configured as not to be directly shocked with the bottom stopper (200). Furthermore, a shock absorbing means such as a urethane or foam cushioning or a damper may be interposed between the bottom stopper (200) and the shock point. Furthermore, an external stopper (300) may be included at a corner area of the upper surface of the holder member (40) according to the exemplary embodiment of the present disclosure.

At least one external stopper (300) may be protrusively formed at a corner area of upper surface at the holder member (40). The external stopper (300) may be protrusively formed at an upper surface of a corner area of the holder member (40) respectively to an upper side and a lateral surface according to an exemplary embodiment as illustrated in FIG. 1. The external stoppers (300) may be diagonally arranged according to an exemplary embodiment, and the external stopper (300) may be formed at four places, each at four corners. However, the present disclosure is not limited thereto, and two external stoppers (300) in a pair may be diagonally arranged based on the holder member (40).

The external stopper (300) may function as a stopper when the holder member (40) performs a tilting or rotating movement in the handshake correcting course of the holder member (40) according to an exemplary embodiment. That is, in performing the handshake correction, when the external stopper (300) is shifted to a direction perpendicular to an optical axis, the external stopper (300) can provide the most excellent image quality, and when the holder member (40) performs a tilting or rotating movement in response to a sensor signal from a position detection sensor, the image quality may deteriorate instead, such that the holder member (40) may need a restriction in the tilting or rotating movement.

In order to avoid this phenomenon, the external stopper (300) may be arranged at a corner area of holder member (40) to allow the holder member (40) to prevent the performance of tilting or rotating movement through interference with an upper side and lateral wall at an inner surface of the cover member (60) as illustrated in FIG. 2. As discussed above, when the external stopper (300) is provided, a peak value at a frequency response characteristic relative to a rotation mode of the holder member (40) can be reduced and therefore, a Q value can be also reduced.

The external stopper (300), when used along with the upper stopper (100), can be configured with a same height as or shorter than that of the upper stopper (100), and can be protruded more than a predetermined size to a lateral surface side of the holder member (40) to allow interfering or colliding with an inner surface at the lateral wall of the cover member (60) ahead of the holder member (40).

Furthermore, the external stopper (300) can also perform the role of the upper stopper (100), and in this case, the upper stopper (100) may be omitted. In this case, the height of the external stopper (300) may be configured to be same or higher than that of the upper stopper (100). When the upper, bottom and external stoppers (100, 200, 300) are respectively formed at an upper surface and a bottom surface of the holder member (40), or formed at any one of the upper surface and bottom surface of the holder member (40), the upper and bottom stoppers (100, 200) may contact an inner lateral surface of the cover member (60) and/or the base when received of a shock to perform the stopper role, whereby deformation of support member (50) can be maximally reduced due to the holder member (40) being excessively position-changed, and the external stopper (300) can restrict the tilting and rotation of the holder member (40).

FIGS. 3(a) and 3(b) are graphs illustrating a frequency response characteristic of a lens driving device, when the first (upper) and bottom stoppers (100, 200) are applied according to an exemplary embodiment of the present disclosure, wherein FIG. 3(a) illustrates a frequency response characteristic of a lens driving device according to prior art and FIG. 3(b) illustrating a frequency response characteristic of a lens driving device according to an exemplary embodiment of the present disclosure.

Referring to FIGS. 3(a) and 3(b), an upper stopping, a tiling stopping and a rotation stopping can be realized by the upper, bottom and external stoppers (100, 200, 300) of the holder member (40) according to an exemplary embodiment of the present disclosure, whereby it can be ascertained that the peak value at the frequency response characteristic relative to rotation mode for handshake correction can be reduced through which Q value can be reduced.

Meantime, the first lens driving device thus configured according to the exemplary embodiment of the present disclosure may be such that the base (10) and the bobbin (30) may be respectively arranged by being distanced from an initial position. In this case, the upper and bottom elastic members may be formed in a flat state of no pre-load being applied, or in a state of a predetermined pre-load being applied. In this case, when a power is applied in a state where the bobbin (30) is spaced apart from the base (10) at a predetermined distance, and when a constant current is applied according to a direction of applied current in a state where the bobbin (30) is spaced apart from the base (10) at a predetermined distance, the first lens driving device may ascend based on the initial position, and the first lens driving device may descend based on the initial position when a reverse current is applied.

A camera module may include the thus-configured lens driving device, a lens barrel coupled to a bobbin (30), an image sensor, and a PCB. At this time, the PCB may be mounted with an image sensor to form a floor surface of the camera module.

The bobbin (30) may include a lens barrel mounted therein with at least one lens, and the lens barrel may be formed by being screw-connected to an inside of the bobbin (30). However, the present disclosure is not limited thereto, and the lens barrel may be directly fixed to an inside of the bobbin (30) by other method than the screw-connection method, or at least one lens may be integrally formed with the bobbin (30) without the lens barrel. An optical system may be formed with one sheet, two sheets or more than two sheets of lenses.

The base (10) may be additionally mounted with an IR (Infrared) cut-off filter at a position corresponding to that of the image sensor (11), and may be coupled to the holder member (40). Furthermore, the base (10) may support a bottom side of the holder member (40). The base (10) may be mounted with a separate terminal member for electrical conduction with the PCB, and may be integrally formed with the terminal using a surface electrode. Meantime, the base (10) may function as a sensor holder configured to protect the image sensor, and in this case, a lug may be downwardly formed along a lateral surface of the base (10). However, this is not an essential configuration, and a separate sensor holder may be arranged at a bottom side of the base (10) to allow serving the role thereof, albeit not being illustrated.

Hereinafter, exemplary embodiments of the present disclosure will be described in detail with reference to the accompanying drawings.

Figure 4:
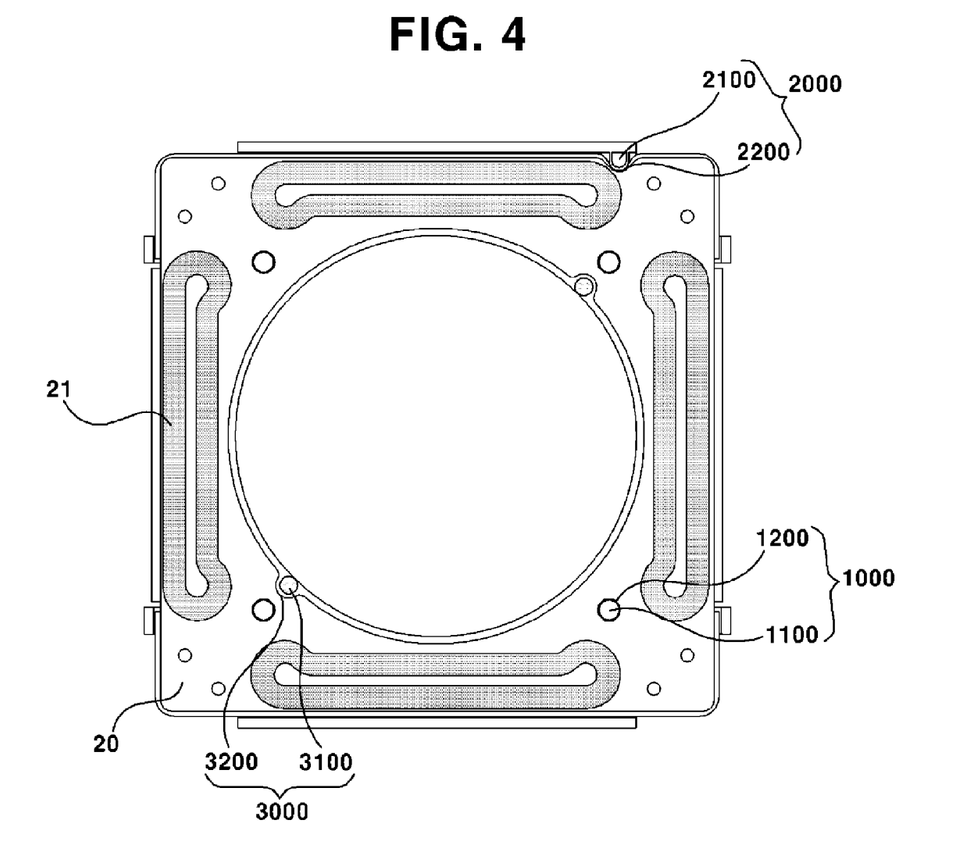
FIG. 4 is a plane view illustrating a base and a circuit board mounted at an upper side of the base according to an exemplary embodiment of the present disclosure.
Figure 5:
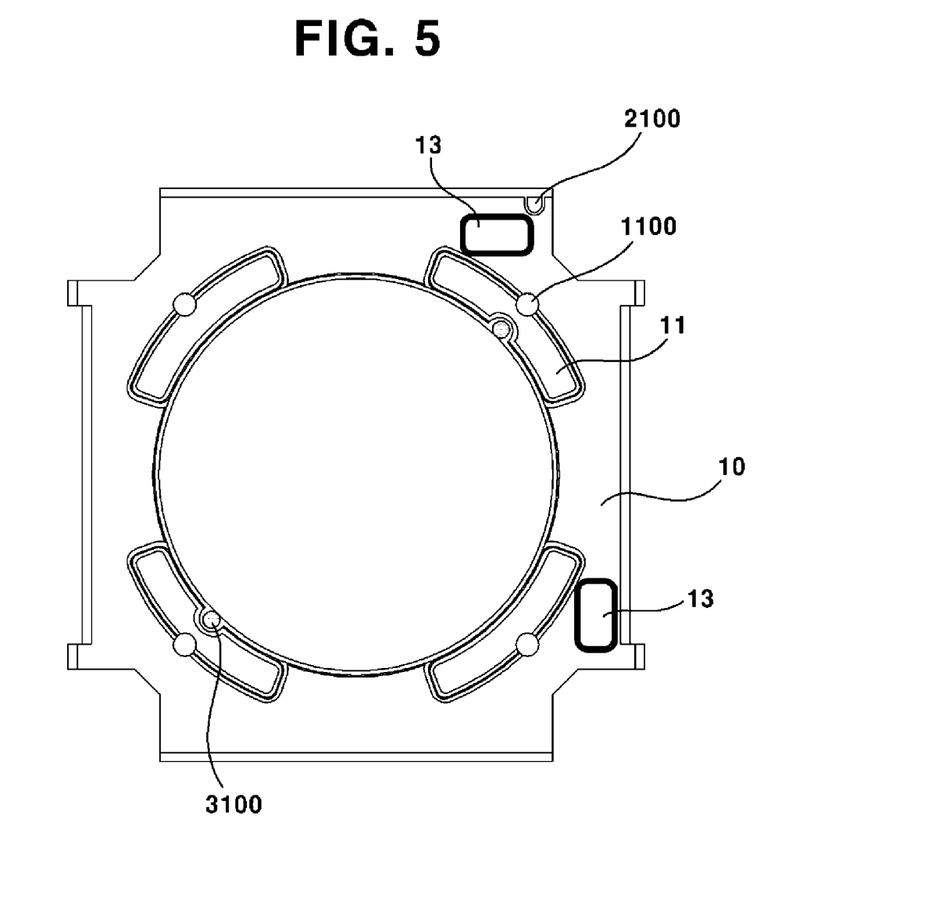
FIG. 5 is a plane view illustrating an upper surface of a base according to an exemplary embodiment of the present disclosure.
Figure 6:
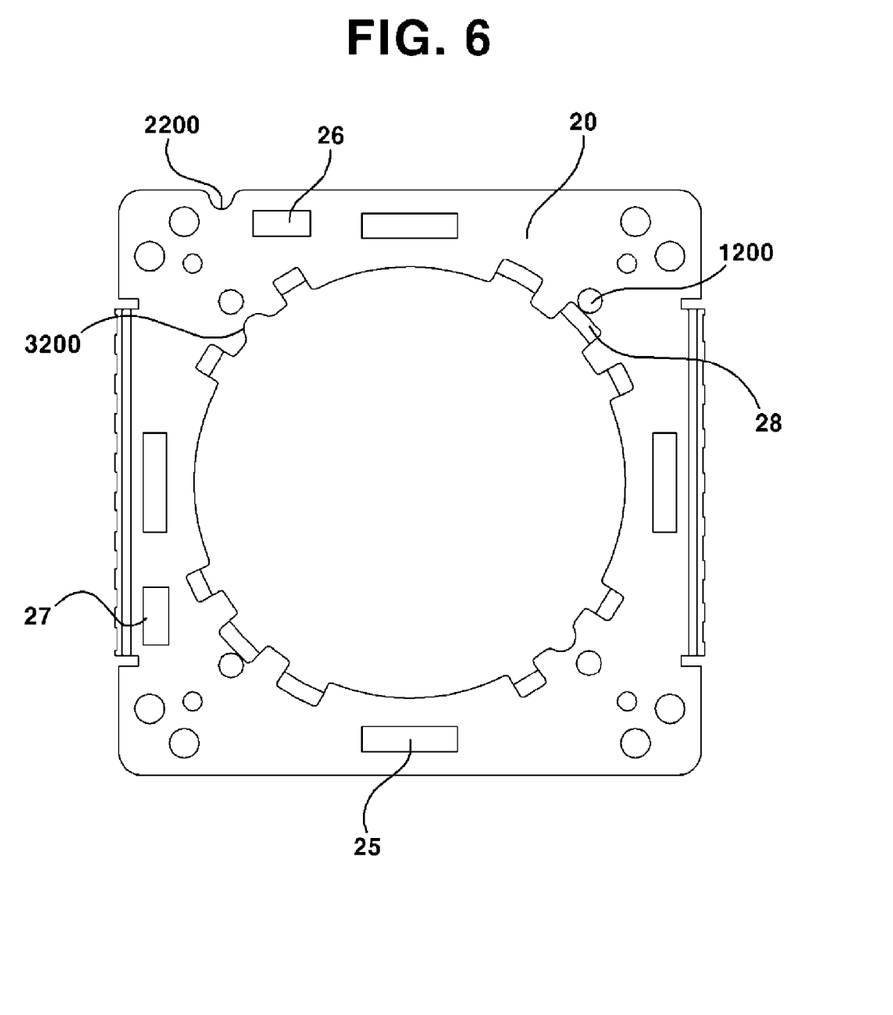
FIG. 6 is a bottom view illustrating a bottom surface of a circuit board according to an exemplary embodiment of the present disclosure.

FIG. 1 is a perspective view illustrating a part of a lens driving device according to an exemplary embodiment of the present disclosure, FIG. 4 is a plane view illustrating a base and a circuit board mounted at an upper side of the base according to an exemplary embodiment of the present disclosure, FIG. 5 is a plane view illustrating an upper surface of a base according to an exemplary embodiment of the present disclosure, and FIG. 6 is a bottom view illustrating a bottom surface of a circuit board according to an exemplary embodiment of the present disclosure.

The lens driving device according to an exemplary embodiment of the present disclosure may include first and second lens driving units, where the first lens driving unit is an autofocusing lens driving unit and the second lens driving unit is a handshake correction lens driving device. The first lens driving unit may include a base (10), a bobbin (30) and a holder member (40). The base (10) may be mounted at an upper surface with at least one circuit board (20), and the circuit board (20) may be mounted with a first coil (21) for activating the second lens driving unit. The first coil (21) is such that a coil pattern may be directly formed on the circuit board (20), or formed on a separate FP coil to be stacked on the circuit board (20). The first coil (21) according to an exemplary embodiment of the present disclosure may include a pattern coil. Furthermore, the first coil (21) may further include a cover member (60) to form an exterior of a camera module and to allow the holder member (40) supporting a plurality of magnets to be arranged thereinside. Furthermore, the base (10) may be coupled to the holder member (60).

The bobbin (30) may be reciprocally mounted in an inner space of the cover member (60) to an optical axis direction. The bobbin (30) may be mounted at a coil accommodation part formed at a periphery with a second coil, where the second coil may ascendably and descendably move the bobbin (30) to a direction parallel to an optical axis in response to an electromagnetic interaction with the plurality of magnets.

The bobbin (30) may be mounted at upper and bottom surfaces with the upper and bottom elastic members. The upper elastic member may be connected at one end to the bobbin (30) and connected at the other end to the holder member (40). The present disclosure is not limited thereto and the upper elastic member may be coupled to the cover member (60), if necessary. When the upper elastic member is coupled to the holder member (40), the upper elastic member may be coupled to an upper surface or a bottom surface of the holder member (60).

The bottom elastic member may be connected at one end to the bobbin (30) and connected at the other end to an upper surface of the base or to a bottom surface of the holder member (60). Furthermore, the base (10) may be formed at a bottom side with a lug for coupling the bottom elastic member and a position corresponding to that of the bottom elastic member may be formed with a hole or a recess whereby the bottom elastic member can be coupled and the bottom elastic member can be prevented from rotating.

Furthermore, an adhesive member may be added for tight fixation, and the lug and the elastic member may be coupled by using thermal bonding.

Meantime, the upper elastic member may be provided with two leaf springs of dually divided structure, while the bottom elastic member may be formed in one body to function as a terminal for reception of a current. That is, a current applied through the terminal (21a) is transmitted through two springs of upper elastic member, where the current may be applied to the coil unit wound on the bobbin (30). To this end, the upper elastic member and the coil unit may be conductively connected by soldering.

Here, the upper elastic member may include an external part coupled to the holder member, an internal part coupled to the bobbin, and a connection part connecting the external part and the internal part, where the internal part may be electrically connected to both distal ends of the first coil through soldering. That is, two springs and the both distal ends of the coil unit may be electrically connected through soldering, Ag epoxy, welding and conductive epoxy. However, the present disclosure is not limited thereto, and conversely, the bottom elastic member may be formed with a dually-divided structure, and the upper elastic member may be integrally formed. Alternatively, the upper elastic member may be formed by being divided into 4 parts or more.

The bobbin (30) may be elastically supported in movement to both directions along an optical axis by the upper and bottom elastic members. That is, the bobbin (30) may be spaced apart from the holder member (40) at a predetermined distance to be upwardly and downwardly controlled in movement about an initial position of the bobbin (30). Furthermore, the initial position of the bobbin (30) may be contacted to a bottom surface of the holder member to be controlled in movement only to an upper side about the initial position of the bobbin (30).

Meantime, the coil unit may be provided in a ring-shaped coil block coupled to a periphery of the bobbin (30). However, the present disclosure is not limited thereto, and the coil unit may be directly wound on the periphery of the bobbin (30). The coil unit, as illustrated in FIG. 2, may be installed at a position near to the bottom surface of the bobbin (30) and may include a straight line surface of a curved surface according to the shape of the bobbin (30). Alternatively, the coil block-shaped coil unit may take an angular shape or an 8-angled shape. That is, the coil block-shaped coil unit may be formed with straight surfaces without any curved surfaces, which is provided in consideration of electromagnetic interaction with the magnet that is oppositely arranged, and when a surface opposite to the magnet is flat surface, a surface of the coil unit may be a flat surface to thereby maximize the electromagnetic force. However, the present disclosure is not limited thereto, and the surface of the magnet and the surface of coil unit may be all curved surfaces or flat surfaces according to design specification, or one of the surface of the magnet and the surface of coil unit may be a curved surface and the other may be a flat surface.

Furthermore, the bobbin (30) may include a flatly-formed first surface formed on a surface opposite to the straight surface in order to allow the coil unit be coupled to the periphery, and a roundly-formed second surface formed on a surface corresponding to the curved surface, where the second surface may be also formed in a flat surface.

The holder member (40) may be formed with an approximately hexahedral shape of frame. The holder member (40) may be respectively formed at upper and bottom surfaces with coupling structures for the upper and bottom elastic members to be coupled, and may be respectively formed at four corners or four lateral surfaces with magnets. At this time, positions where the magnets are mounted may be installed with accommodation parts (not shown). However, the present disclosure is not limited thereto, and magnets may be directly bonded and fixed to inner surfaces of the holder member (40) free from accommodation parts. When the magnets are directly fixed to the holder member (40), the magnets may be also directly bonded and fixed to lateral surfaces or corners of the holder member (40). Furthermore, unlike the exemplary embodiment, when an autofocusing unit is mounted instead of a handshake correction unit, only the cover member (60) may be mounted without a separate holder member (40).

The cover member (60) may be formed with a metal material of strong magnetic substance such as steel. Furthermore, the cover member (60) may be provided with an angular shape when viewed from an upper side in order to encompass all areas of the bobbin (30). Furthermore, the cover member (60) may take a square shape as illustrated in FIG. 4, and may be provided with an octagonal shape, albeit not being illustrated. In addition, when viewed from an upper side, and when the cover member (60) is provided with an octagonal shape, the magnetic field emitted from the corners of the holder member (40) may be minimized when the shape of magnet arranged at the corner of the holder member (40) is provided with a trapezoidal shape.

The first lens driving unit may be formed as discussed above, and the first lens driving unit may be also substituted with optical systems realized with other types of autofocusing functions than the abovementioned configuration. That is, the first lens driving unit may be also formed with an optical system using a single lens moving actuator or a refractive index-variable actuator instead of using the autofocusing actuator of VCM method. That is, any optical actuator capable of performing auto focusing function may be used for the first lens driving unit.

Meantime, the second lens driving unit may include, for handshake correction purpose, may include a first lens driving unit, a base (10), a support member (50), a circuit board (20) and first and second sensors (25, 26).

The configuration of base (10) is as discussed above, and may be formed with a guide lug (1100) and a first recess part (11, described later) as illustrated in FIG. 5. Furthermore, the guide lug (1100) may be arranged at a position near to the first recess part (11). The first recess part (11) may be coated with an adhesive member for fixing the circuit board (20). A total of four first recess parts (11) may be formed according to an exemplary embodiment of the present disclosure. Furthermore, the first recess part (11) may be diagonally mounted about the base (10). Furthermore, the first recess part (11) may be formed at a position not interfering with the first coil (21, see FIG. 4).

Furthermore, the base (10) may further include, at a position not interfering with the first recess part (11), at least one second recess part (13) mounted with a position detection sensor configured to detect a magnetic force of a magnet opposite to the first coil (21). Two second recess parts (13) are provided according to an exemplary embodiment of the present disclosure at which the first and second sensors (26, 27) may be arranged or inserted, and the first and second sensors (26, 27) may be further fixed by using epoxy.

The circuit board (20) may include a first circuit board mounted with a position detection sensor, and the first coil (21). However, the present disclosure is not limited thereto, and the first circuit board and the first coil (21) may be formed in a single circuit board. In the present exemplary embodiment, the circuit board (20) may be formed with mutually separated first circuit board and the first coil (21), where the first coil (21) may be formed with a pattern coil or an FP (Fine Pattern) coil, and the first coil (21) may be stacked at an upper surface of the first circuit board for mutual electric conduction therebetween.

In this case, both distal ends of the first coil (21) may be conductibly fixed to the terminal part (28) of the circuit board by the soldering. That is, as illustrated in FIG. 6, a terminal part (23) of the first coil (21) and a terminal part (28) of the circuit board (20) may be overlappingly arranged, and the terminal parts (23, 28) may need at least eight (8) areas for soldering when a total of four (4) first coils (21) is provided. If a terminal of the first coil (21) applicable with a same signal among the first coils (21) is shared, the number of terminal parts (23, 28) for soldering may decrease to a number lower than eight (8). Furthermore, the number of terminal parts may be four (4), or six (6), and therefore there is no limit thereto.

At this time, the circuit board (20) may be provided with an FPCB (Flexible Printed Circuit Board) and may be mounted at an upper surface of the base (10). The first coil (21) may shift and/or tilt and/or horizontally move an entire first lens driving unit to a plane direction perpendicular to an optical axis through mutual interaction with the magnet. The first coil (21) is arranged at a position of the circuit board (20) corresponding to that of a floor surface of the magnet by way of pattern coil method, and when the magnet is mounted at each wall surface area of the holder member (40), for example, the first coil (21) may be arranged at each surface area mutually corresponding to that of the circuit board (20). In the exemplary embodiment, four (4) first coils (21) may be arranged opposite to the magnet, and the present disclosure is not limited thereto, and two first coils (21) may be arranged to face other, or alternatively, at least six (6) first coils (21) may be arranged. Furthermore, two first coils facing the magnet may be arranged instead of one first coil.

Meantime, referring to FIGS. 1 and 6, the circuit board (20) may be arranged with an escape part (25) opposite to the first coil (21), and the escape part (25) may be coated with adhesive member. That is, the circuit board (20) may further include a second circuit board (22) stacked on an upper side of the first circuit board according to an exemplary embodiment of the present disclosure, and at this time, the first coil (21) may be formed on the second circuit board (22) to be conductibly connected to the first circuit board. In order to fix the first coil (21) formed on the second circuit board (22) and the second circuit board (22), the escape part (25) may be formed at a position corresponding to that of the circuit board (20) to arrange a space into which the adhesive member can permeate for fixing the second circuit board (22) to the escape part (25). The escape part (25) may be formed at a center of the first coil (21) or near to the center of the first coil (21). At this time, configuration is so arranged as not to form a gap between the second circuit board (22) and the circuit board (20) in order to allow the adhesive member to permeate into an inside of the escape part (25). Furthermore, the circuit board (20) may further include a plurality of terminal parts (28) to electrically connect and/or fix the terminal part (28) to a distal end of the first coil (21) or a terminal part (not shown) of the second circuit board (22).

According to the abovementioned configuration, when a portion formed with a terminal (21a) is bent as illustrated in FIG. 1, the second circuit board (22) stacked on an upper side of the circuit board (20) can be tightly adhered to an upper side of the circuit board (20) by the adhesive member coated on the escape part (25), whereby come-off (looseness) at a surface contact area therebetween can be prevented, and areas other than the bent area can be avoided from being bent in the course of bending a portion formed with the terminal (21a), whereby interference or contact with a driving part such as the bobbin (30) can be prevented to thereby minimize the performance defect caused by hysteresis, for example.

The circuit board (20) thus configured may be mounted at a surface opposite to the base (10) with a first sensor (26) and a second sensor (27) insertedly coupled to the second recess part (13, see FIG. 5), where the first sensor (26) may detect a first direction movement of the holder member (40) or X axis direction movement, while the second sensor (27) may detect a second direction movement of the holder member (40) or Y axis direction movement. At this time, the first direction and the second direction are mutually orthogonal directions, and diagonal directions of the X and Y axis movements. Meantime, the first and second sensors (26, 27) may be mounted at the second circuit board (22) side. In this case, a position corresponding to the first and second sensors (26, 27) of the circuit board (20) may be formed with a through hole through which the first and second sensors (26, 27) can inserted into the second recess part (13). At this time, the first and second sensors (26, 27) inserted into the second recess part (13) may be inserted without any separate adhesive member and may be position-fixed to a relevant area through adhesive member such as bond.

The position detection sensor thus configured may be mounted on the circuit board (20). However, the present disclosure is not limited thereto, and may be directly arranged/or mounted to the base (10). The position detection sensor may detect a magnetic field to detect a movement perpendicular to an optical axis of the holder member (40) mounted with the magnet. In the exemplary embodiment, the position detection sensor may include first and second sensors (26, 27), and the first and second sensors (26, 27) may be arranged at mutually different positions lest they be overlapped, to detect movement of X axis direction which is a direction perpendicular to the optical axis of the first lens driving unit and Y axis, or movement of first direction which is a diagonal direction and movement of second direction.

Meantime, the lens driving device according to an exemplary embodiment of the present disclosure may be arranged at upper and bottom surfaces of the holder member (40) with an upper stopper (100) in order to minimize damage to the support member (50) when there is generated a sudden external shock. At this time, an external stopper (300) may be additionally added.

The upper stopper (100) may be protrusively formed at an upper surface of the holder member (40) in a plural number as illustrated in FIG. 1. The upper stopper (100) may be arranged at an approximate center area of each surface of the holder member (40) according to an exemplary embodiment of the present disclosure. However, the present disclosure is not limited thereto, and two upper stoppers may be arranged at each surface if necessary. The upper stopper (100) may be provided with a hexahedral shape, where an upper surface of the upper stopper may be flatly formed.

The support member (50) may be formed with a wire member, and two support members may be mounted at each corner area of the circuit board (20) and the holder member (40). One end of the support member (50) may be coupled to an external part of the upper elastic member, and the other end of the support member (50) may be coupled to the second circuit board (22), the circuit board (20) or to the base (10), and combinations thereof may be also possible. Furthermore, when the other end of the support member (50) is coupled or electrically connected or soldered to the second circuit board (22), the second circuit board (22) may not be formed with a separate hole. FIG. 6 according to the exemplary embodiment of the present disclosure illustrates a case where a hole (29) is formed.

Meantime, the upper elastic member connected by the support member (50) may be provided with a dually divided structure, and performs the autofocusing function by receiving an electric power through the support member (50). At this time, the support member (50) may be electrically connected to the circuit board (20) and the second circuit board (22), or electrically connected to a PCB (not shown) to supply an electric power to an autofocusing unit side.

Furthermore, the lens driving device according to an exemplary embodiment of the present disclosure may be provided with a first guide unit (1000) configured to constantly guide an assembly position of the base (10) and the circuit board (20) at all times during assembly process. At least one or a plurality of first guide units (1000) may be provided, and the first guide unit (1000) may include a guide lug (1100) and a through hole (1200).

Referring to FIGS. 4 and 5, the guide lug (1100) may be integrally and protrusively formed at an upper surface of the base (10). However, the present disclosure is not limited thereto and the guide lug may be formed by inserting a pin member. The guide lug (1100) may be arranged on an imaginary line connecting a center of the base (10) and a corner area as illustrated, but the present disclosure is not limited thereto and may be provided in a cylindrical shape. A total of four guide lugs (1100) may be protrusively formed according to the exemplary embodiment of the present disclosure, and each of the guide lug (1100) may be spaced apart from the center of the base (10) at a predetermined distance. Thus, the plurality of guide lugs (1100) may be diagonally arranged about the base (10).

Referring to FIGS. 4 and 6, the through hole (1200) may be penetratively formed at a position corresponding to that of the guide lug (1100), and may be formed in a shape corresponding to that of the guide lug (1100). The shape of through hole (1200) may be round, and when the guide lug (1100) takes a polygonal shape including a triangle and a square, the through hole (1200) may take a shape corresponding thereto. The through hole (1200) may be formed at the second circuit board (22) and the circuit board (20), or may be formed only on the circuit board (20).

As noted from the foregoing, the first guide unit (1000) may be arranged at a position not interfering with the first coil (21). For example, when the first coil (21) is arranged at each surface area of the base (10) and the circuit board (20), the first guide unit (1000) may be arranged near at the corner. Furthermore, the lens driving device according to an exemplary embodiment of the present disclosure may further include a second guide unit (2000) configured to guide a position of a circumferential surface of the circuit board (20). Furthermore, the lens driving device according to an exemplary embodiment of the present disclosure may only include a second guide unit (2000) free from the first guide unit (1000). The second guide unit (2000) may include a first boss (2100) and a first groove part (2200).

The first boss (2100) may be protrusively formed at an upper surface of the base (10) and may be arranged at a position near to a periphery of the base (10). At this time, only one first boss (2100) may be eccentrically arranged to a distal end of a side as illustrated in FIG. 5. The circuit board (20) can be assembled and coupled to the base (10) with a constant directivity through this configuration, the configuration of which is to guide the first and second sensors (26, 27) to be mounted on the circuit board (20) each at an accurate position.

The first groove part (2200) may be formed at a position corresponding to that of the first boss (2100) of the circuit board (20). The first groove part (2200) may be concavely formed at a circumferential surface of the circuit board (20) and may be formed in a shape corresponding to that of the first boss (2100). For example, when the first boss (2100) is made of a cylindrical shape, the first groove part (2200) may be provided with a semi-circular shape. Furthermore, each of the first boss (2100) and the first groove part (2200) may be arranged at a position not interfering with the first coil (21).

The first groove part (2200) may be formed at the second circuit board (22) and the circuit board (20), or may be formed only at the circuit board (20). Meantime, the lens driving device according to an exemplary embodiment of the present disclosure may further include a third guide unit (3000) in order to guide a position of an inner surface of the base (10) and the circuit board (20). The present disclosure is not limited thereto and the lens driving device according to an exemplary embodiment of the present disclosure may be formed only with the third guide unit (3000) free from the first and second guide units (1000, 2000), and these guide units (1000, 2000, 3000) may be also independently combinable.

The third guide unit (3000) may include a second boss (3100) protrusively formed at a position near to an inner surface of the base (10), and a second groove part (3200) formed at a position corresponding to that of the second boss (3100) of the circuit board (20). At this time, the third guide unit (3000) may be symmetrically arranged about the base (10) and the circuit board (20), but the position is not limited thereto. Furthermore, the third guide unit (3000) may be arranged on an imaginary line connecting a center of the base (10) and the circuit board (20) and both corner areas. The second groove part (3200) may be formed at the second circuit board (22) and the circuit board (20), or may be formed only at the circuit board (20).

Meantime, the first lens driving device thus configured according to the exemplary embodiment of the present disclosure may be such that the base (10) and the bobbin (30) may be respectively arranged by being distanced from an initial position. In this case, the upper and bottom elastic members may be formed in a flat state of no pre-load being applied, or in a state of a predetermined pre-load being applied. In this case, when a power is applied in a state where the bobbin (30) is spaced apart from the base (10) at a predetermined distance, and when a constant current is applied according to a direction of applied current in a state where the bobbin (30) is spaced apart from the base (10) at a predetermined distance, the first lens driving device may ascend based on the initial position, and the first lens driving device may descend based on the initial position when a reverse current is applied.

A camera module may include the thus-configured lens driving device, a lens barrel coupled to a bobbin (30), an image sensor, and a PCB. At this time, the PCB may be mounted with an image sensor to form a floor surface of the camera module.

The bobbin (30) may include a lens barrel mounted therein with at least one lens, and the lens barrel may be formed by being screw-connected to an inside of the bobbin (30). However, the present disclosure is not limited thereto, and the lens barrel may be directly fixed to an inside of the bobbin (30) by other method than the screw-connection method, or at least one lens may be integrally formed with the bobbin (30) without the lens barrel. An optical system may be formed with one sheet, two sheets or more than two sheets of lenses.

The base (10) may be additionally mounted with an IR (Infrared) cut-off filter at a position corresponding to that of the image sensor (11), and may be coupled to the holder member (40). Furthermore, the base (10) may support a bottom side of the holder member (40). The base (10) may be mounted with a separate terminal member for electrical conduction with the PCB, and may be integrally formed with the terminal using a surface electrode. Meantime, the base (10) may function as a sensor holder configured to protect the image sensor, and in this case, a lug may be downwardly formed along a lateral surface of the base (10). However, this is not an essential configuration, and a separate sensor holder may be arranged at a bottom side of the base (10) to allow serving the role thereof, albeit not being illustrated.

Although the present disclosure has been described in detail with reference to the foregoing embodiments and advantages, many alternatives, modifications, and variations will be apparent to those skilled in the art within the metes and bounds of the claims. Therefore, it should be understood that the above-described embodiments are not limited by any of the details of the foregoing description, unless otherwise specified, but rather should be construed broadly within the scope as defined in the appended claims.

That is, all of the elements can be selectively coupled and operated as long as they are within the scope of the present disclosure. Furthermore the present disclosure may be capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

While certain exemplary embodiments have been described and shown in the present disclosure, it is to be understood that such embodiments are merely illustrative of and not restrictive on the broad invention, and that this disclosure not be limited to the specific constructions and arrangements shown and described, since various other modifications may occur to those ordinarily skilled in the art upon studying this disclosure. While the present disclosure has been described in conjunction with several specific embodiments, many further alternatives, modifications, variations and applications will be apparent to those skilled in the art that in light of the foregoing description. Thus, the invention described herein is intended to embrace all such alternatives, modifications, variations and applications as may fall within the spirit and scope of the appended claims.

What is claimed is:

1. A lens driving device, comprising:
    a holder member;
    a bobbin disposed in the holder member;
    a first coil disposed on the bobbin;
    a magnet disposed on the holder member;
    a base disposed below the holder member;
    a circuit board disposed on the base;
    an elastic member coupled with the holder member; and
    a support member disposed coupled with the elastic member, wherein the support member is electrically connected to the circuit board;
    wherein the base comprises a hole formed at a center portion of the base, a boss protruding from an upper surface of the base and a recess recessed from the upper surface of the base,
    wherein the circuit board comprises a first circuit board disposed on the upper surface of the base and provided with an FPCB (Flexible Printed Circuit Board), and a second circuit board disposed on an upper surface of the first circuit board;
    wherein the first circuit board comprises a first hole formed at a center portion of the first circuit board, a first terminal part disposed on a lower surface of the first circuit board and to be electrically connected to the second coil of the second circuit board, and two second terminal parts configured to be electrically connected to a printed circuit board coupled with an image sensor;
    wherein the second circuit board comprises a second hole formed at a center portion of the second circuit board and a second coil formed with a pattern coil,
    wherein a first groove is formed on an inner periphery of the first hole of the first circuit board and disposed at a position corresponding to that of the boss of the base, and a second groove is formed on an inner periphery of the second hole of the second circuit board and disposed at a position corresponding to that of the boss of the base;
    wherein the first groove of the first circuit board and the second groove of the second circuit board comprise a shape corresponding to that of the boss of the base,
    wherein at least a portion of the boss of the base is disposed in the first groove of the first circuit board,
    wherein at least a portion of the boss of the base is disposed in the second groove of the second circuit board,
    wherein the recess of the base is disposed at a position corresponding to that of the first terminal part of the circuit board, wherein a ring shaped portion is formed on the upper surface of the base by a difference between a diameter of the hole of the base and a diameter of the first hole of the first circuit board when the first circuit board is disposed on the upper surface of the base, wherein at least a portion of the boss is protruded from the ring shaped portion toward an outer periphery of the second circuit board, wherein the first groove of the first circuit board is formed toward an outer periphery of the first circuit board from the inner periphery of the first hole of the first circuit board, and wherein the second groove of the second circuit board is formed toward the outer periphery of the second circuit board from the inner periphery of the second hole of the second circuit board.

2. A lens driving device, comprising:
a holder member;
a bobbin disposed in the holder member;
a first coil disposed on the bobbin;
a magnet disposed on the holder member and facing the first coil;
a base disposed below the holder member;
a circuit board disposed on the base;
an upper elastic member coupled with the holder member and the bobbin; and
a support member coupled with the upper elastic member, wherein the support member is electrically connected to the circuit board;
wherein the base comprises a first hole formed at a center portion of the base and a boss protruding from the upper surface of the base,
wherein the circuit board comprises a second coil facing the magnet, a second hole formed at a center portion of the circuit board, and a groove;
wherein the second hole of the circuit board is disposed at a position corresponding to that of the first hole of the base,
wherein the groove of the circuit board is formed on an inner periphery of the second hole of the circuit board and comprises a curved shape corresponding to that of the boss of the base,
wherein the boss of the base comprises a plurality of boss parts and the groove of the circuit board comprises a plurality of groove parts,
wherein a ring shaped portion is formed on the upper surface of the base by a difference between a diameter of the first hole of the base and a diameter of the second hole of the circuit board when the circuit board is disposed on the upper surface of the base, and
wherein at least a portion of each of the plurality of boss parts is disposed outside the ring shaped portion.

3. The lens driving device of claim 2, wherein the circuit board comprises a first circuit board disposed on the upper surface of the base and provided with an FPCB (Flexible Printed Circuit Board), and a second circuit board comprising the second coil formed with a pattern coil and disposed on an upper surface of the first circuit board, wherein the first circuit board comprises a first terminal part disposed on a lower surface of the first circuit board and electrically connected to the second coil of the second circuit board, and two second terminal parts configured to be electrically connected to a printed circuit board coupled with an image sensor;

wherein the first terminal part of the first circuit board comprises at least eight terminals to be electrically connected to the second coil of the second circuit board by a solder, wherein the two second terminal parts of the first circuit board comprise a plurality of terminals and are disposed on two lateral surfaces of the base opposite to each other, respectively, wherein the plurality of boss parts are spaced apart from each other, and wherein at least a portion of the boss of the base is disposed in the groove of the first circuit board.

4. The lens driving device of claim 3, further comprising a sensor coupled with the lower surface of the first circuit board, wherein the base further comprises a recess recessed from the upper surface of the base, wherein the recess of the base is disposed at a position corresponding to that of the first terminal part of the circuit board, wherein the bobbin is spaced apart from the holder member in an optical axis direction at an initial position such that the bobbin is configured to move upwardly and downwardly from the initial position, wherein the bobbin is configured to ascend from the initial position when a forward current is applied to the first coil, and the bobbin is configured to descend from the initial position when a reverse current is applied to the first coil; and wherein the upper elastic member comprises at least four upper elastic member parts, and two of the at least four upper elastic member parts are electrically connected to the first coil.

5. A lens driving device, comprising:
a holder member;
a bobbin disposed in the holder member;
a first coil disposed on the bobbin;
a magnet disposed on the holder member and facing the first coil;
a base disposed below the holder member;
a circuit board disposed on the base;
an upper elastic member coupled with the holder member and the bobbin; and
a support member coupled with the upper elastic member and the circuit board;
wherein the base comprises a first hole formed at a center portion of the base, a lug protruding from an upper surface of the base, and a first boss protruding from the upper surface of the base and spaced apart from the lug;
wherein the circuit board comprises a second coil facing the magnet, a second hole formed at a center portion of the circuit board, a third hole, and a first groove;
wherein the second hole of the circuit board is disposed at a position corresponding to that of the first hole of the base,
wherein the third hole of the circuit board is disposed at a position corresponding to that of the lug of the base and spaced apart from an inner periphery of the second hole of the circuit board and an outer periphery of the circuit board,
wherein the first groove of the circuit board is formed on the inner periphery of the second hole of the circuit board and disposed at a position corresponding to that of the first boss of the base,
wherein the first groove of the circuit board comprises a shape corresponding to that of the first boss of the base, wherein the first boss comprises two boss parts and the first groove comprises two groove parts, and wherein at least a portion of each of the two boss parts is disposed in a respective one of the two groove parts.

6. The lens driving device of claim 5, wherein the bobbin is spaced apart from the holder member in an optical axis direction at an initial position such that the bobbin is configured to move upwardly and downwardly from the initial position, wherein the bobbin is configured to ascend from the initial position when a forward current is applied to the first coil, and the bobbin is configured to descend from the initial position when a reverse current is applied to the first coil, and wherein the first boss of the base and the first groove of the circuit board are configured to couple the circuit board to the base at a predetermined position.

7. The lens driving device of claim 5, wherein the first boss comprises a first boss part and a second boss part spaced from each other, wherein the first boss part is disposed opposite to the second boss part with respect to the first hole of the base, wherein the lug comprises a first lug part and a second lug part spaced apart from each other, and wherein the first lug part is disposed opposite to the second lug part with respect to the first hole of the base.

8. The lens driving device of claim 5, wherein the circuit board comprises a first circuit board disposed on the upper surface of the base and provided with an FPCB (Flexible Printed Circuit Board), and a second circuit board comprising the second coil formed with a pattern coil and disposed on an upper surface of the first circuit board; and wherein the first circuit board comprises a terminal part to be electrically connected to a terminal part of the second circuit board, and the terminal part of the first circuit board is fixed to the terminal part of the second circuit board.

9. The lens driving device of claim 5, wherein the holder member comprises a first stopper protruding from an upper surface of the holder member and a second stopper protruding from a lower surface of the holder member, wherein a distance between the second stopper and the circuit board is same as or shorter than a distance between the magnet and the circuit board, in an optical axis direction, and wherein a lower end of the first stopper is disposed lower than a lower end of the magnet.

10. The lens driving device of claim 5, wherein the circuit board further comprises a first terminal part electrically connected with the second coil and disposed on a lower surface of the circuit board, wherein the base further comprises a first recess recessed from the upper surface of the base and disposed at a position corresponding to that of the first terminal part of the circuit board, wherein the first recess comprises four recess parts spaced apart from each other, and wherein the four recess parts of the first recess are disposed at positions corresponding to those of four corners of the base, respectively.

11. The lens driving device of claim 10, wherein the two boss parts are symmetrically disposed with respect to an optical axis; and wherein the first terminal part comprises at least eight terminals to be electrically connected to the second coil by a solder.

12. The lens driving device of claim 10, further comprising a sensor coupled with the lower surface of the circuit board, wherein the base further comprises a second recess recessed from the upper surface of the base and accommodating at least a portion of the sensor, wherein the circuit board further comprises two second terminal parts including a plurality of terminals, wherein the two second terminal parts are disposed on two lateral surfaces of the base opposite to each other, respectively;

wherein the first groove of the circuit board comprises a curved shape corresponding to that of the first boss of the base, and wherein the upper elastic member comprises at least four upper elastic member parts, and two of the at least four upper elastic member parts are electrically connected to the first coil.

13. The lens driving device of claim 12, wherein the second recess comprises a first recess part and a second recess part spaced apart from each other and has a rectangular shape, and wherein a first imaginary line in a direction along a long side of the first recess part of the second recess meets a second imaginary line in a direction along a long side of the second recess part of the second recess.

14. The lens driving device of claim 5, wherein the base further comprises a second boss protruding from the upper surface of the base, wherein the circuit board further comprises a second groove disposed on the outer periphery of the circuit board, and wherein the second boss is disposed at a position corresponding to that of the second groove.

15. The lens driving device of claim 14, wherein the second groove of the circuit board is disposed on the upper surface of the base, wherein the circuit board further comprises two second terminal parts including a plurality of terminals, wherein the two second terminal parts are disposed on two lateral surfaces of the base opposite to each other, respectively; and wherein the second groove is disposed nearer to one of the two lateral surfaces of the base than to the other of the two lateral surfaces of the base.

16. A camera module, comprising:
the lens driving device of claim 5;
a printed circuit board disposed below the base;
an image sensor coupled with the printed circuit board;
a filter disposed at a position corresponding to that of the image sensor; and
a lens coupled with the bobbin.

17. An optical apparatus comprising the camera module of claim 16.

* * * * *